United States Patent [19]
d'Auria et al.

[11] 3,943,559
[45] Mar. 9, 1976

[54] TELECINEMA SYSTEM USING ELECTROLUMINESCENT DIODES

[75] Inventors: Luigi d'Auria; Guy Chevalier; Michel Favreau; Jean Pierre Huignard; Jean Pierre Lacotte; Claude Puech, all of Paris, France

[73] Assignee: Thomson-CSF, Paris, France

[22] Filed: Apr. 22, 1974

[21] Appl. No.: 463,121

[30] Foreign Application Priority Data
Apr. 20, 1973 France .................. 73.14634

[52] U.S. Cl. .................. 358/6; 178/7.2
[51] Int. Cl.² .................. H04N 5/84
[58] Field of Search ....... 178/7.2, DIG. 30, DIG. 28; 358/6, 41, 42, 54

[56] References Cited
UNITED STATES PATENTS

| | | | |
|---|---|---|---|
| 2,834,832 | 5/1958 | Somers | 178/DIG. 28 |
| 3,584,149 | 6/1971 | Flory | 178/DIG. 28 |
| 3,743,771 | 7/1973 | Ohta et al. | 178/7.2 |
| 3,816,654 | 6/1974 | Brightman | 178/7.2 |

*Primary Examiner*—Richard Murray
*Attorney, Agent, or Firm*—Karl F. Ross; Herbert Dubno

[57] ABSTRACT

A cinematographic film to be reproduced by television is driven at constant speed in synchronism with the sweep cycle of one or more camera tubes each positioned to pick up images projected upon a receiving surface thereof whose luminous persistence equals at least a sweep cycle. The film is periodically transluminated, during the retrace phase of the scanning beam, by a light pulse emitted by an electroluminescent diode — or by a cluster of such diodes operating on different wavelengths — defining a quasi-pinpoint light source, the diode being excited by an energizing pulse whose length does not exceed the duration of a line scan of the camera tube.

4 Claims, 5 Drawing Figures

TELECINEMA SYSTEM USING ELECTROLUMINESCENT DIODES

The invention relates to telecinema systems for reproducing cinematographic films for the purpose of televising them. Such systems use a light source for successively projecting the frames of a film onto a camera-tube target.

If a conventional cinematograph projector is used for this purpose in association with a camera tube, difficulties arise since the film is jerky. As is known, the successive periods when the film is stationary have to be made to coincide with the scanning period of the camera tube.

If the film runs at a constant speed, the successively projected frames can be made persistent if the film is illuminated by a number of very short light pulses. In that case, the light source is a flash tube giving light pulses having a repetition frequency equal to the camera-tube-raster scanning frequency.

The disadvantage of flash tubes is that they have a large emitting surface, so that a complex, expensive projection lens system is required in order to make maximum use of the luminous flux. The working life and the reliability of flash tubes are also unsatisfactory.

With a view to obviating the aforementioned disadvantages, a system according to our invention includes a quasi-pinpoint light source for transluminating a cinematographic film to be reproduced by television, this light source being positioned in line with lens means for projecting images of that film onto a receiving surface of a camera tube. The light source, including an electroluminescent diode or a cluster of such diodes with different operating wavelengths, in the case of color television, receives energizing pulses from a generator triggered during retrace intervals between sweep cycles of the tube, the length of an energizing pulse being not greater than the duration of a line scan; the luminous persistence of the receiving surface equals at least a sweep cycle so that the projected image remains available during the entire scanning period. The film is driven at constant speed in synchronized relationship with the sweep cycle of the tube.

The invention will be more clearly understood and other features will become apparent from the following description and the accompanying drawing in which.

According to the invention, the optical projector used is of conventional design but is simplified in the following two ways: the discontinuously running film drive is replaced by a continuous constant-speed driving system; and the projection lamp is simplified, owing to the provision of a quasi-point emitting surface of the light source, which comprises one or more diodes.

Figure 1:
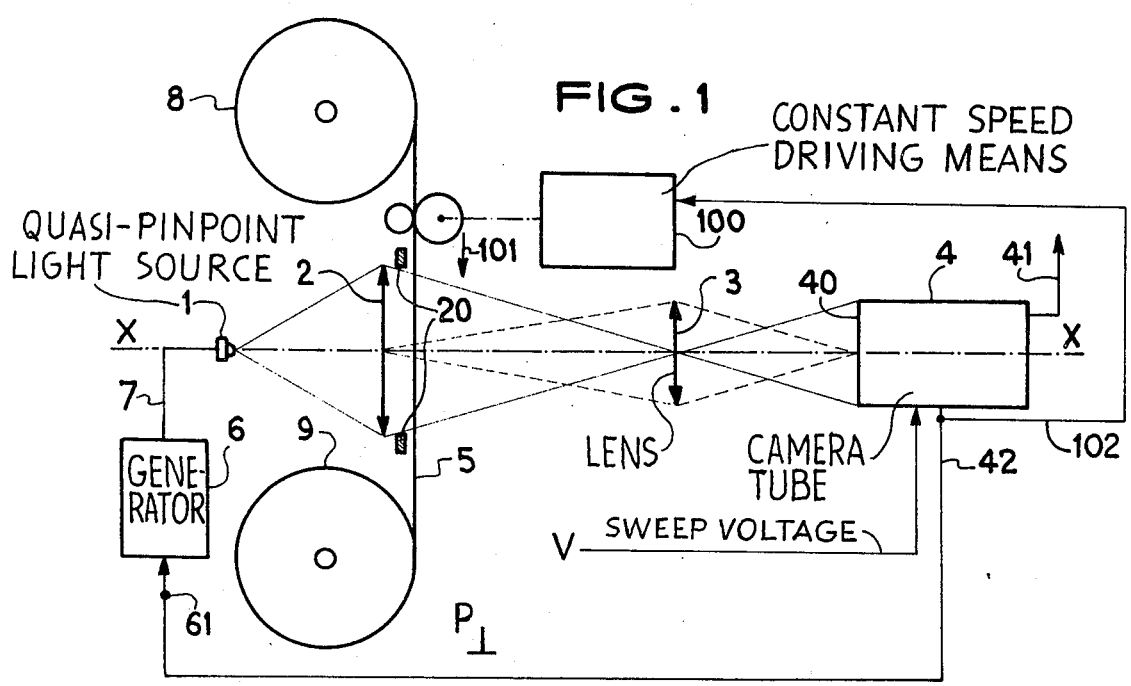
FIG. 1 shows a diagram of a system utilizing the principles of our invention in the case of black-and-white television.

FIG. 1 diagramatically shows a non-limitative example of a telecinema device for black-and-white television wherein, according to the invention, an electroluminescent diode 1 is used instead of the conventional light source. Diode 1 emits short light pulses when energized by an electric power source 6 delivering current pulses via a screened connecting cable 7.

Diode 1 is disposed on the common optical axis X—X of a condenser 2 and a projection lens 3 whose pupil coincides with the image of source 1 formed by condenser 2. A film 5 to be projected moves on a pair of reels 8, 9 perpendicularly to axis X—X and very near the surface of the condenser. Driving means 100 move the film 5 at constant speed in the direction of arrow 101. A camera tube 4 is installed on the other side of lens 3 so that its receiving surface 40 is illuminated by the image of the flat portion of film 5 disposed in the projection window 20 associated with condenser 2. Tube 4 has two signal outputs, namely an output 41 for "video" signals and an output 42 for synchronization signals, i.e. vertical scanning signals of the raster of the projected frames. Output 42 is connected to a synchronization input 61 of the energizing-pulse generator 6, so that the latter is periodically triggered.

The device operates as follows. If complete frames in the television system follow at the rate of 25 per second, diode 1 is triggered at the same rate by the energizing generator. The emitted light pulses should be so short that the film moves a negligible distance during the flash. Satisfactory results are obtained if the pulse duration is 32 microseconds, i.e. about half the time taken to scan a line in the case of a 625-line television system. The sensitive surface of the camera tube should have sufficient remanence for the image to remain visible on target 40 during the scanning of a complete sweep cycle consisting of a pair of interlaced frames. The driving means 100 are adjusted so that frames follow continuously at the rate of 25 per second. They are synchronized with the vertical scanning signals (output 42) by means diagrammatically represented by a connection 102.

It is important to ensure that the camera tube is not saturated during the irradiation phase. To this end the light pulses must occur during the retrace phase of the scanning beam, i.e. during the time when the video signal is below the black level and does not produce a visible image on a television-receiver screen.

Figure 2:
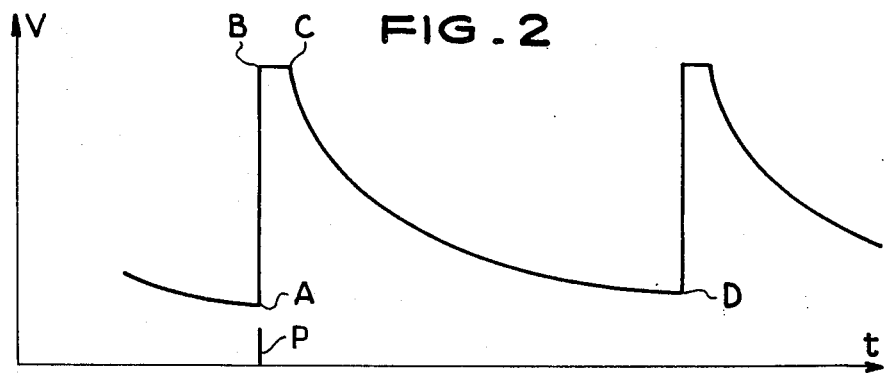
FIG. 2 is an explanatory graph.

FIG. 2 shows the oscillogram of the raster-scanning sweep voltage V fed to tube 4. The graph indicates a scanning period ABCD having a steep rising flank AB and a progressively decreasing portion CD. The scanning period is 20 ms at a rate of 50 rasters per second. The duration of the plateau BC may be about 1450 microseconds, during which time the light source must be triggered by a pulse P, shown to coincide with the leading edge of the generally sawtooth-shaped voltage pulse ABCD, a 40-millisecond interval equaling two scanning periods being left between adjacent trigger pulses.

Figure 3:
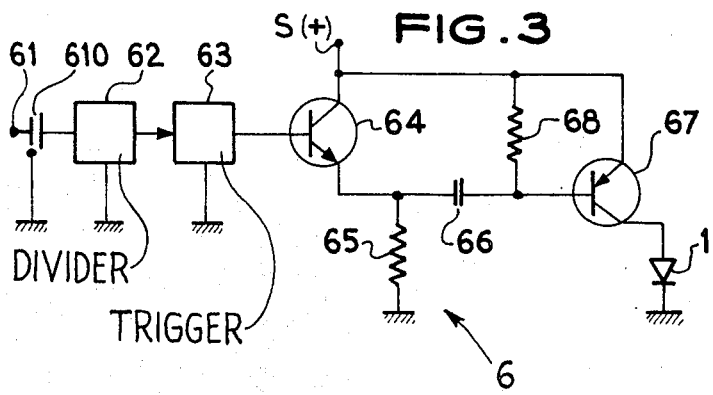
FIG. 3 shows the electric circuit of an energizing-pulse generator for the system of FIG. 1.

FIG. 3 diagrammatically shows a non-limitative example of details of generator 6 connected to the electroluminescent diode 1; the electric power supplies are not shown. A divider circuit 62 divides by two the number of differentiated scanning pulses received at its input 61; circuit 62 is followed by a monostable trigger circuit 63, both being indicated by a simple block since they are conventional circuits realizable e.g. in the form of integrated circuits. The input 61 is followed by a capacitor 610 protecting the circuit 62 against the d.c. voltages emitted by the camera tube.

The generator also comprises power stages delivering electric pulses for energizing diode 1. Trigger 63 works into the base of a transistor 64, here shown to be of the NPN type, whose collector is supplied with a positive voltage via a terminal S and whose emitter is connected to ground via a resistor 65. The output of transistor 64, which operated in the common collector mode, is connected via a high-value capacitor 66 to the base of a complementary PNP transistor 67, which operates in the common-emitter mode. The emitter of transistor 67 is connected to the terminal S of the supply source and its collector is connected to ground via diode 1. A resistor 68 is connected between the emitter and the base of this transistor and cooperates with capacitor 66 so as to block the d.c. component of the output current.

Generator 6 operates as follows: Synchronization pulses are developed between input 61 and ground. Out of each two pulses, one is transmitted to circuit 63 by circuit 62 which is adjusted so as to preserve only one pulse per sweep cycle. The leading edge AB of the sawtooth pulse shown in FIG. 2 capacitatively triggers an input of circuit 63, the length of the emitted energizing pulse being determined by the interval time constant of the circuit (32 microseconds in the present case). Transistor 67 directly energizes the electroluminescent diode 1 at the required intensity. The choice of transistor 67 depends on the diode-energizing current. In practice, the diode is advantageously subjected to the maximum current it can tolerate, e.g. a current of the order of 1 ampere. The average current for a 32-micro-second flash at a rate of 25 per second is:

$$\frac{25 \times 32}{10^6} = 0.8 \text{ milliampere}$$

This is usually much lower than the maximum permanent current compatible with the thermal dissipation of the diode.

Figure 4:
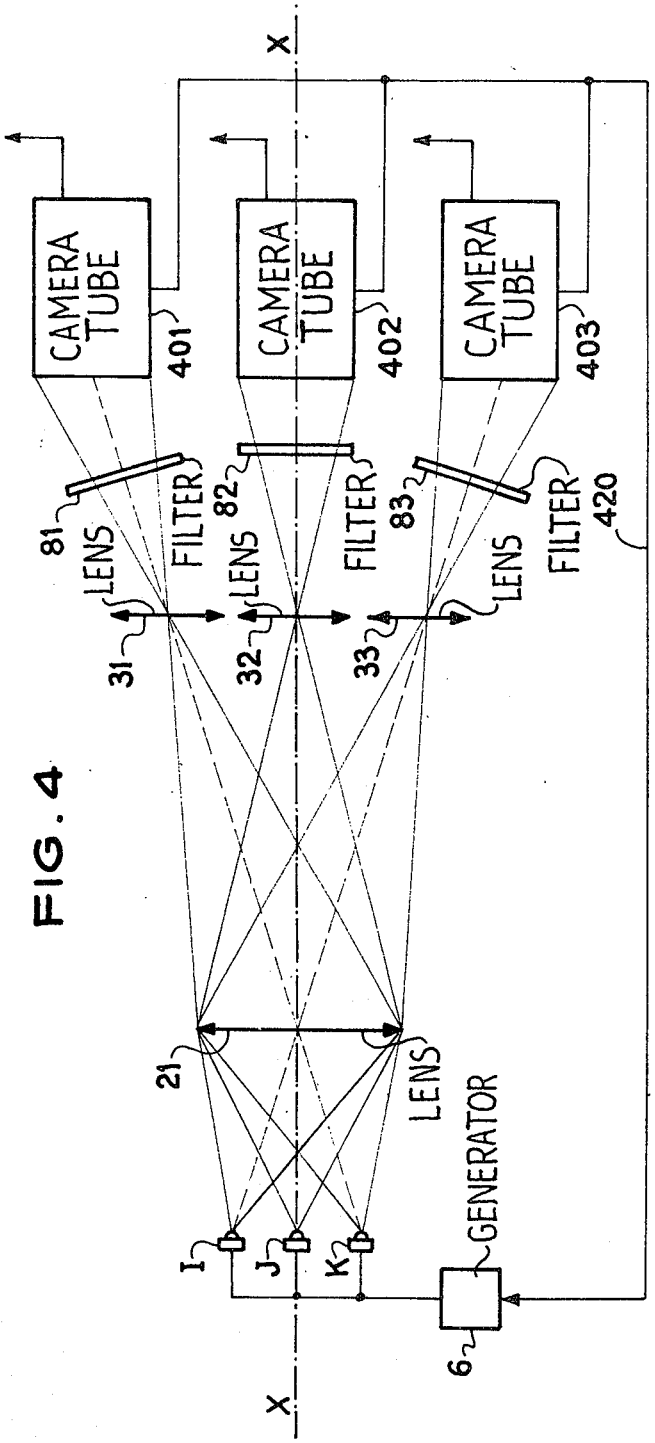
FIG. 4 shows a diagram of a system utilizing the principles of our invention in the case of color television.

FIG. 4 is a block diagram of another embodiment of our invention relating to the case of color-film reproduction. The film and its reels (not shown) are disposed as in FIG. 1. Three light sources I, J, K emit red, green and blue light pulses respectively. Source J only is disposed on the X—X axis of the telecinema apparatus which comprises a single condenser 21 and three projection lenses 31, 32, 33 disposed in a single plane perpendicular to the X—X axis in order to receive the images of sources, I, J, K formed by condenser 21. To this end, sources I, K and lenses 31, 33 are off-center with respect ot the X—X axis. Owing to the quasi-point nature of the light sources used, there is no undue deviation from the optical axis and the lenses normally used in telecinema apparatus are sufficiently satisfactory to ensure good reproduction of the film frames on the receiving surfaces of three camera tubes 401, 402, 403 which are disposed so that the film frames provided by lenses 31, 32, 33 are imaged on these receiving surfaces. The three tubes are synchronously scanned and the common scanning signals drive the generator 6 via a connection 420.

When the emitted radiation corresponds to the primary colors of color-television systems, the correct color components travel in the three optical channels of the device shown in FIG. 4, thus obviating the need for filters, which is an advantage of the invention. If desirable, however, filters 81, 82, 83 can be disposed in the path of the light rays between the lenses and a camera tube, e.g. in order to correct the color reproduction in each channel.

Figure 5:
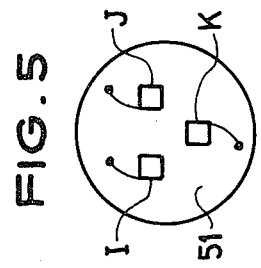
FIG. 5 is a diagram of an array of three photoemissive diodes for the system of FIG. 4.

In an alternative embodiment for reproducing color films, three diodes I, J, K, emitting the three primary colors, are closely grouped on a very small support 51 (FIG. 5). Since the emitting surface of each diode is of the order of 100 square microns, the three sources can be mounted on a support 51 measuring about 1 square millimeter. The three photoemissive diodes can therefore be considered as a point source. Accordingly, the telecinema device comprises in that instance a single lens 3 disposed as in FIG. 1 with respect to source 1, which in the present case comprises a cluster of diodes emitting the three primary colors. Optical means (not shown) are disposed on the other side of the lens so as to obtain three images of the source at different locations. The optical means comprise e.g. two semi-transparent mirrors disposed at 45° to the X—X axis shown in FIG. 1. The images are projected onto the receiving surfaces of three camera tubes after undesirable wavelengths have been eliminated by three filters disposed in front of these surfaces as shown in FIG. 4.

With regard to the choice of the electroluminescent diodes, it is known that the three primary colors (red, green and blue) can be reproduced by photoemissive diodes using the following suitably doped semiconductors:

| | |
|---|---|
| Ga As P | for red, |
| Ga P | for green, |
| Ga N | for blue. |

The emission lines can be adjusted by using appropriate doping substances. The resulting light power for a 50-mA supply current is of the order of 10 microwatts but can greatly exceed a milliwatt without impairing the operation of the diode.

What we claim is:

1. A telecinema system comprising:
   photoelectric transducer means including at least one camera tube provided with a receiving surface;
   lens means in line with said camera tube for projecting images of a cinematographic film onto said receiving surface, said tube being provided with sweep means for scanning the projected images in a recurrent raster of line and frame scans with successive sweep cycles separated by intervening retrace intervals;
   a quasi-pinpoint light source including at least one electroluminescent diode positioned in line with said lens means for transluminating said film;
   constant-speed drive means for said film synchronized with said sweep means; and
   a generator of energizing pulses for said diode connected to said sweep means for triggering during said retrace intervals, said energizing pulses having a length not exceeding the duration of a line scan, said receiving surface having a luminous persistence lasting for at least a sweep cycle.

2. A telecinema system as defined in claim 1 wherein said sweep means produces a generally sawtooth-shaped voltage pulse with a leading edge followed by a plateau, said generator being provided with differentiation means for detecting said leading edge to trigger the emission of an energizing pulse.

3. A telecinema system as defined in claim 2 wherein a sweep cycle encompasses a pair of interlaced frames, said generator including frequency-dividing means in cascade with said differentiation means for making only every other voltage pulse effective to trigger the emission of an energizing pulse.

4. A telecinema system as defined in claim 1 wherein said light source comprises a cluster of electroluminescent diodes energizable by said generator for emitting light pulses of different wavelengths.

* * * * *